United States Patent [19]
Chou

[11] Patent Number: 5,440,790
[45] Date of Patent: Aug. 15, 1995

[54] STRAP LOCKING DEVICE

[76] Inventor: An-Chuan Chou, No. 212, Yung An Street, Tainan, Taiwan

[21] Appl. No.: 155,789

[22] Filed: Nov. 23, 1993

[51] Int. Cl.⁶ ............................................. B65B 11/00
[52] U.S. Cl. ...................................... 24/302; 24/309; 24/68 CD; 410/117
[58] Field of Search ............... 410/96, 100, 117, 118, 410/97; 24/308, 315, 307, 170, 171, 301, 302, 68 CD, 309

[56] References Cited

U.S. PATENT DOCUMENTS

| | | |
|---|---|---|
| 1,934,697 | 11/1933 | Butterworth . |
| 2,442,266 | 5/1948 | Davis ........................... 24/68 CD |
| 2,845,676 | 8/1958 | Huber . |
| 2,932,871 | 4/1960 | Phillips et al. . |
| 3,173,539 | 3/1965 | Looker . |
| 3,961,585 | 6/1976 | Brewer . |
| 4,667,904 | 5/1987 | Herndon . |
| 4,770,459 | 9/1988 | Nakaiwa et al. . |
| 4,886,403 | 12/1989 | Gresham . |
| 4,906,023 | 3/1990 | Kreger et al. . |
| 5,123,153 | 6/1992 | Krauss ............................. 24/171 X |
| 5,144,724 | 9/1992 | Chuan ............................. 24/68 CD |
| 5,173,996 | 12/1992 | Chou ............................. 410/100 X |
| 5,193,955 | 3/1993 | Chou ............................. 24/68 CD X |

FOREIGN PATENT DOCUMENTS

| | | | |
|---|---|---|---|
| 1028058 | 5/1953 | France ................................ 24/300 |
| 2059321 | 5/1971 | Germany ........................ 24/68 CD |
| 2839305 | 3/1980 | Germany ............................ 410/97 |
| 151009 | 2/1932 | Switzerland ...................... 24/308 |
| 2178472 | 2/1987 | United Kingdom . |
| 1220967 | 3/1986 | U.S.S.R. . |
| 1650489 | 5/1991 | U.S.S.R. . |

*Primary Examiner*—James R. Brittain
*Attorney, Agent, or Firm*—Morton J. Rosenberg; David I. Klein

[57] ABSTRACT

A strap locking device is provided. The strap locking device includes a strap locker having a plate body with a plurality outward projecting ends spaced apart and extending in different directions. Each of the outward projecting ends is formed with a buckle for locking a strap of adjustable length. Each strap has its outer end bound to a hook for engagement with a hook of a truck or other support for freight. A strap stopper may be substituted for the buckle, the strap stopper having both ends formed flat to loosely fit within two slots provided in two opposing side walls formed in the plural ends of the plate body. The strap stopper has a round intermediate portion to clamp a strap and make it immovable when the strap is pulled taut. One of the ends of the plate body may be provided with only a strap slot for coupling to a strap of predetermined length.

6 Claims, 10 Drawing Sheets

STRAP LOCKING DEVICE

BACKGROUND OF THE INVENTION

Ropes or straps of rather large size or tough rubber straps are commonly used for binding freight, goods or merchandise on a truck, or pick-up. In such binding operations, a worker has to stop and loosen a strap when the strap comes to a corner of goods.

SUMMARY OF THE INVENTION

This invention has been devised to offer a strap locking device for binding freight, goods or merchandise on a truck or a pick-up, which requires little time and labor to accomplish.

The strap locking device in the present invention includes a strap locker having a plate body with a plurality of outward projecting ends. Each end may be formed with either a buckle, a strap stopper or only a slot for a strap to pass through. A strap is combined with each buckle, each strap stopper or each strap slot. Each strap has its distal end coupled to a hook, the hook being for engagement with a respective hook provided on a truck, or a pick-up, so that the strap locker can be applied to tightly bind freight, goods, or merchandise placed thereon for transportation.

The plate body of the strap locker may have three or four outward projecting ends on which are formed buckles. Alternately, one end may be provided with only a strap slot for binding a strap of predetermined length. In another alternative, strap stoppers may be substituted for the buckles. The strap stoppers have opposing ends which are flat shaped to fit loosely in two respective slots in respective opposing side walls formed in a respective end of the plate body. An intermediate portion is provided to stop and make immovable a strap which passes through a gap between the strap stopper and the plate body when the strap is pulled taut. The strap has a hook coupled to its outer end for engagement on a hook of a truck, or a pick-up.

BRIEF DESCRIPTION OF THE DRAWINGS

The invention will be better understood by reference to the accompanying drawings, wherein.

DESCRIPTION OF THE PREFERRED EMBODIMENTS

Figure 1:
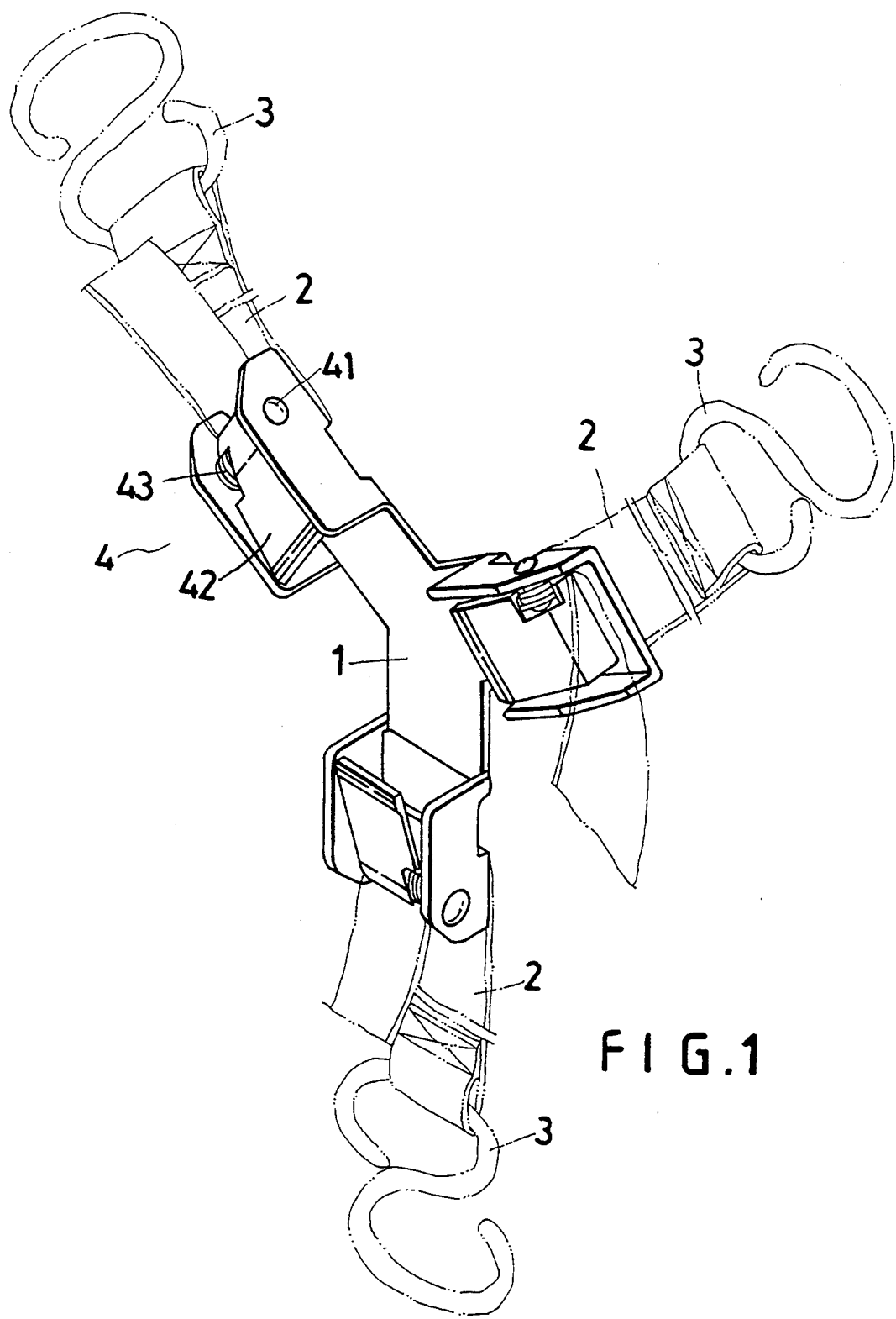
FIG. 1 is a perspective view of a first embodiment of a strap locking device of the present invention.

The main structure of a first embodiment of the strap locking device, as shown in FIG. 1, includes a strap locker 1 having three buckles 4 formed at three outward projecting ends of an integrally formed plate body, three straps 2, and three hooks 3 bound on respective outer ends of each strap 2.

The strap locker 1 is formed by an integrally formed plate member with three buckles 4 formed on each of the three outward projecting ends of the plate body. The three ends extend in three directions, each end being spaced apart from the others at an equal angle. Each buckle 4 has a pair of opposite side walls 11, 11, and a push plate 42 provided between the pair of side walls 11, 11 and pivotally coupled thereto by a pin 41. A torque spring 43 is provided to fit around the pin 41 to enable the push plate 42 to have one end always press down on a bottom plate to clamp a strap 2 therebetween, to make the strap 2 immovable at a selected length. The length of strap 2 is adjustable and extends through the gap formed in the end of the buckle 4 and has its outer end coupled to a hook 3 to engage a hook of a truck or other support for freight. The opposing end of the push plate 42 can be displaced to in turn make the end clamping the strap 2 rise up to free the strap 2, so that its length can be adjusted.

Figure 2:
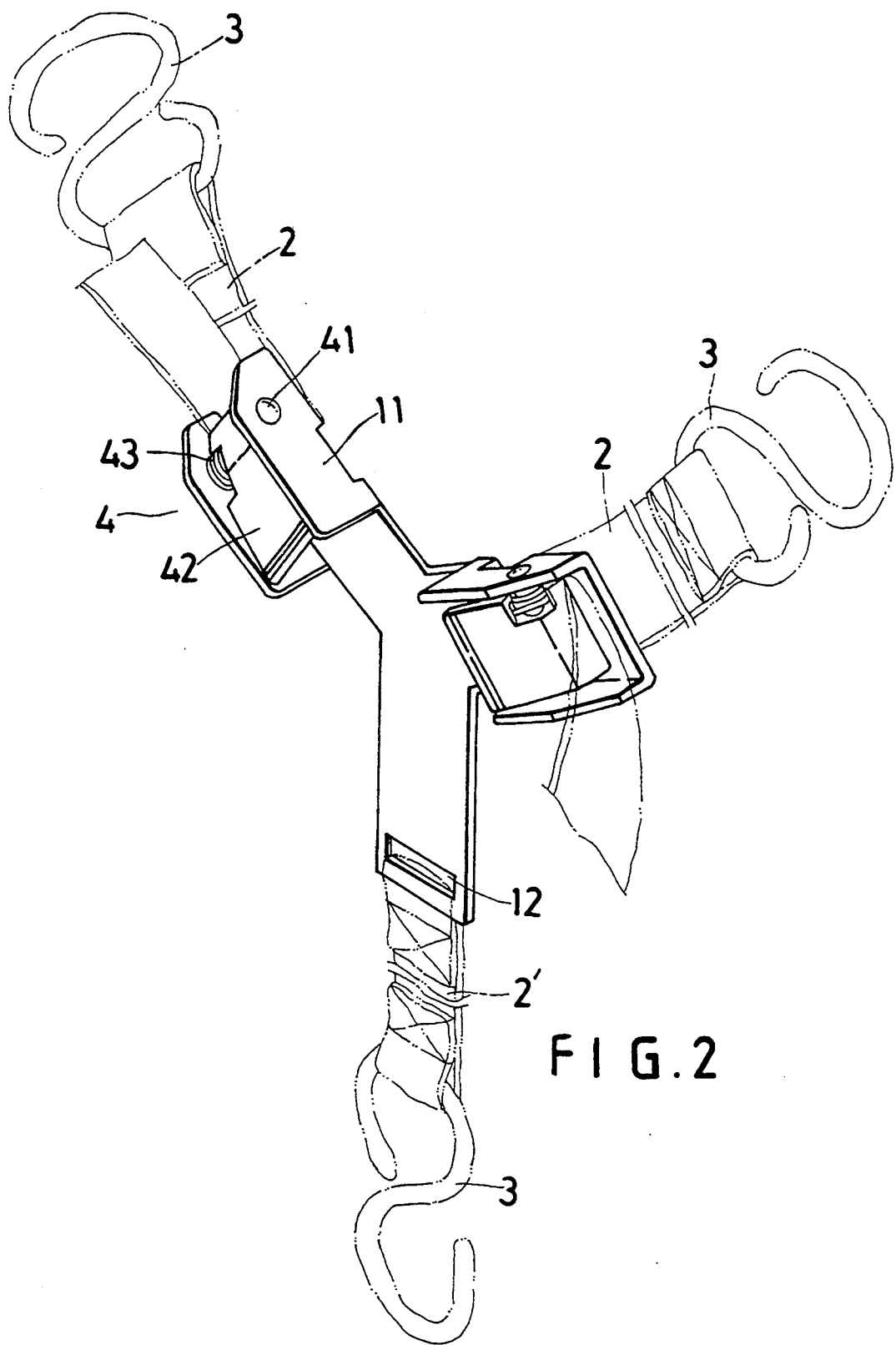
FIG. 2 is a perspective view of a second embodiment of the strap locking device of the present invention.

A second embodiment of the strap locking device, as shown in FIG. 2, includes a strap locker 1 having two buckles 4, 4 formed in two of the three ends of a plate body. The third end is formed with a strap slot 12, which is for a strap 2' of a predetermined length to go through. The distal end of strap 2' is coupled to a hook 3.

Figure 3:
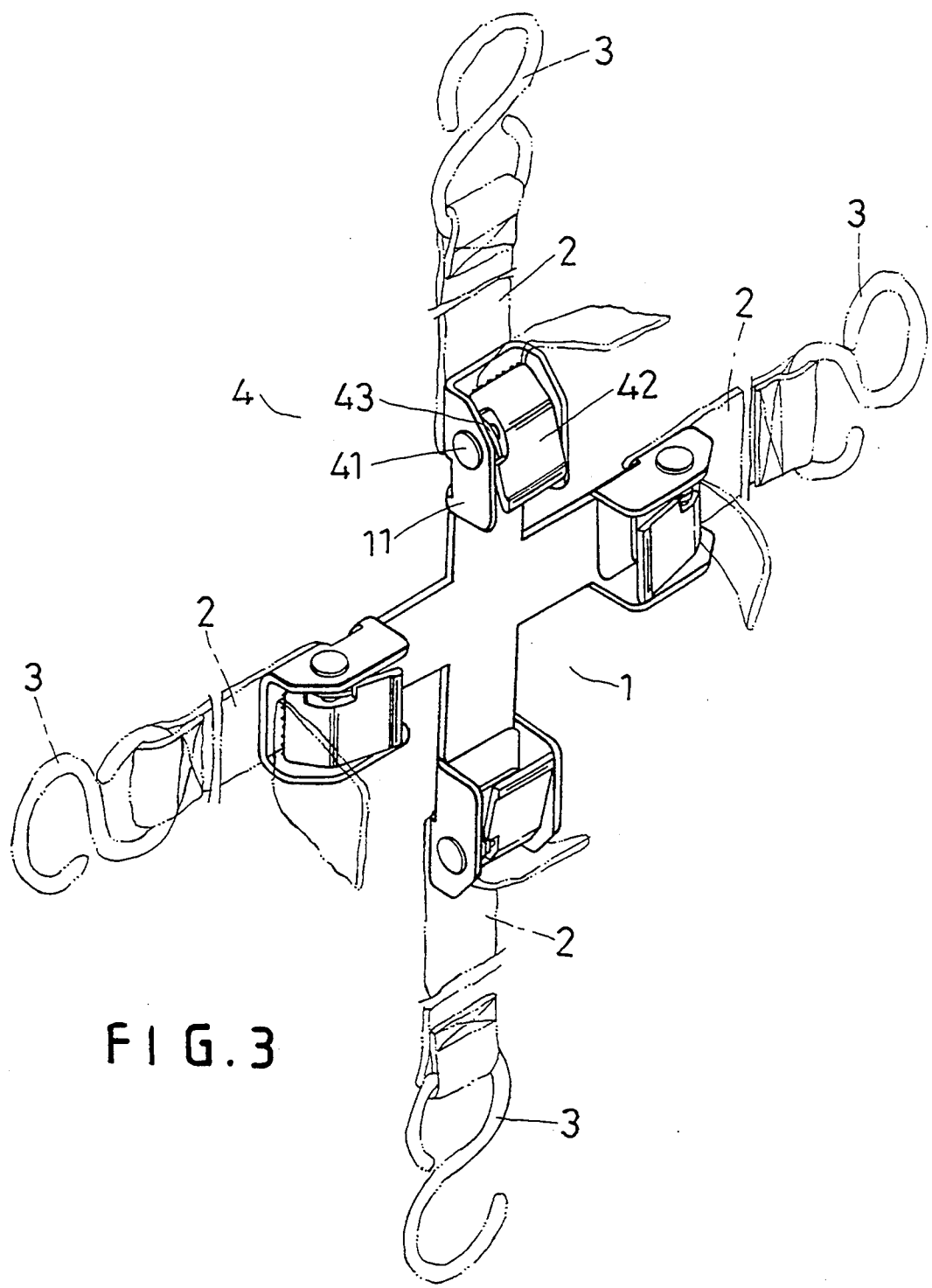
FIG. 3 is a perspective view of a third embodiment of the strap locking device of the present invention.

A third embodiment of the strap locking device, as shown in FIG. 3, includes a strap locker 1 having four buckles 4 integrally formed on four ends of a cross-shaped plate body. Each buckle 4 has the same structure as those in the first and the second embodiment.

Figure 4:
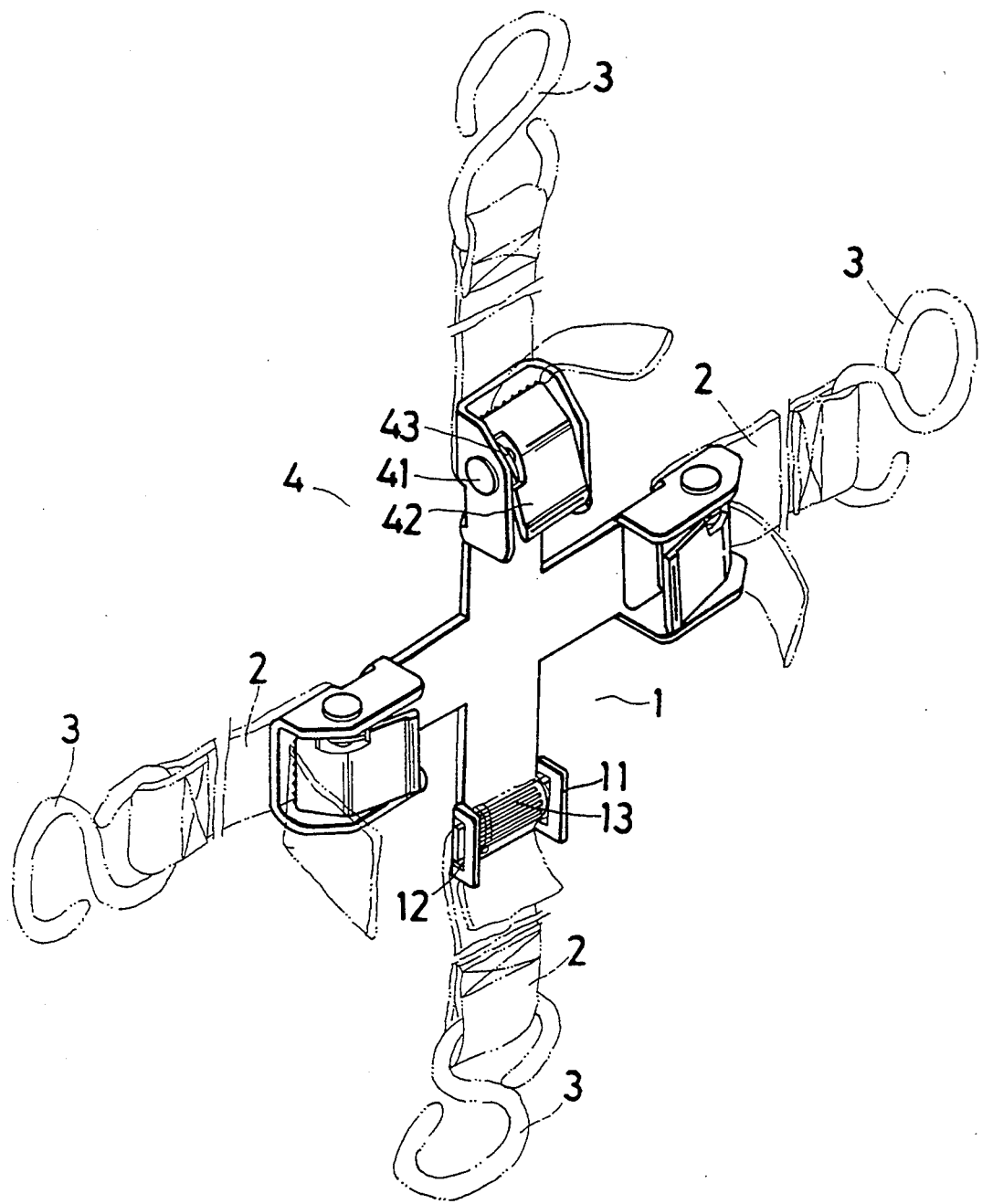
FIG. 4 is a perspective view of a fourth embodiment of the strap locking device of the present invention.

A fourth embodiment of the strap locking device, as shown in FIG. 4, includes a strap locker 1 having three buckles 4 and one strap stopper 13 formed in one of the four ends of a cross-shaped plate body. The buckles 4 are the same as those in the first, the second and the third embodiments. The strap stopper 13 has a pair of opposing flat ends to fit loosely in two respective slots 12, 12 formed in respective opposing side walls 11, 11 formed in the end of the plate body. The strap stopper 13 has a round intermediate portion with a rough outer surface for clamping the strap 2, which is wound on it, when the strap 2 is pulled taut by the hook 3, engaged to a hook of a truck Or other support for freight.

Figures 5, 6:
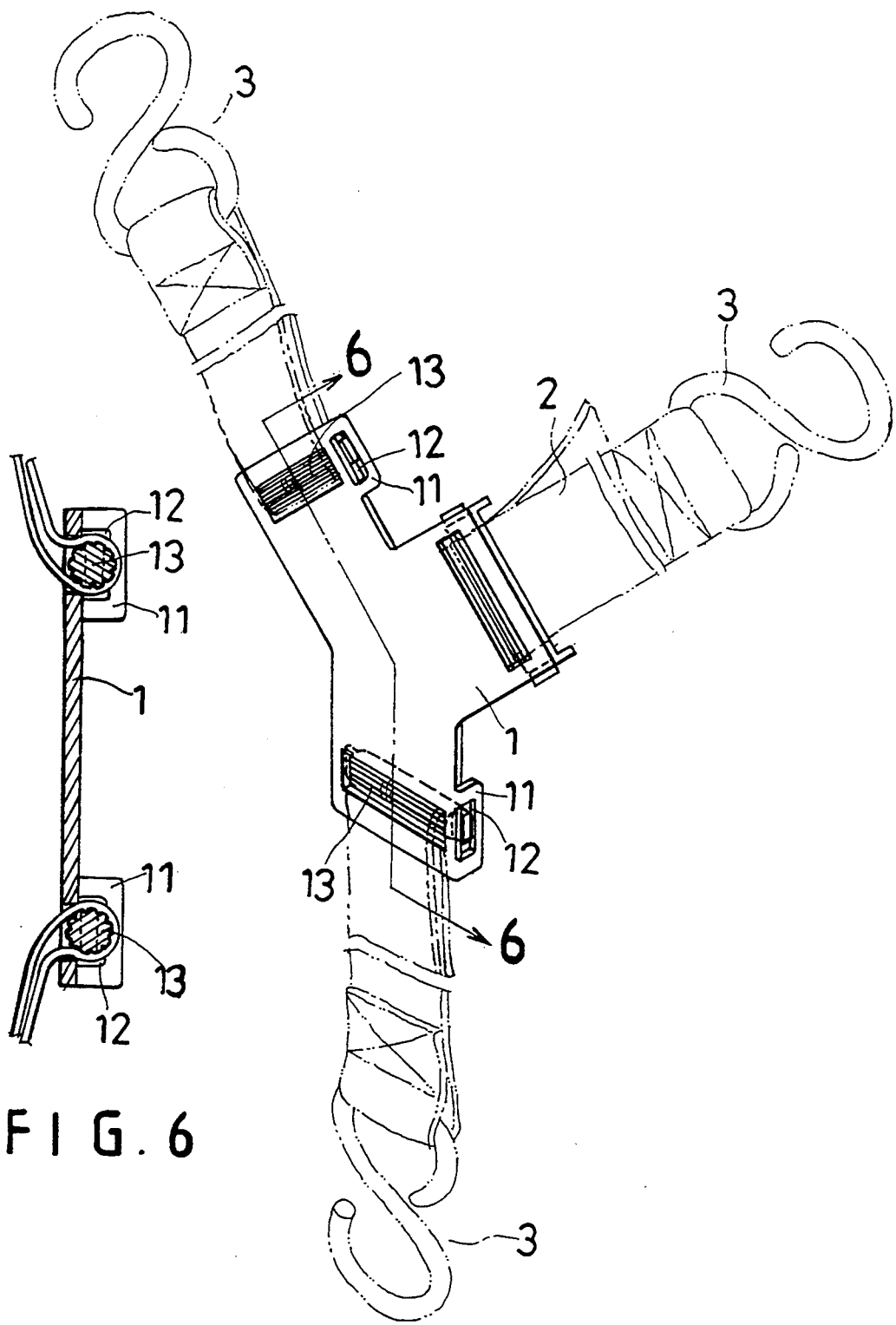
FIG. 5 is a perspective view of a fifth embodiment of the strap locking device of the present invention.
FIG. 6 is a sectional view taken along the line 6—6 of the FIG. 5 of the present invention.

A fifth embodiment of the strap locking device, as shown in FIGS. 5 and 6, includes a strap locker 1 having three strap stoppers 13 integrally formed on three ends of a plate body. The three ends extend in three different directions and are spaced apart at different angles. Each strap stopper 13 has opposing flat ends disposed in respective slots 12, 12 formed in opposing walls 11, 11, and having the same structure as that described for the fourth embodiment. A strap 2 of adjustable length is wound on the strap stopper 13 and has its distal end coupled to a hook 3 for engaging a hook of a truck.

Figure 7:
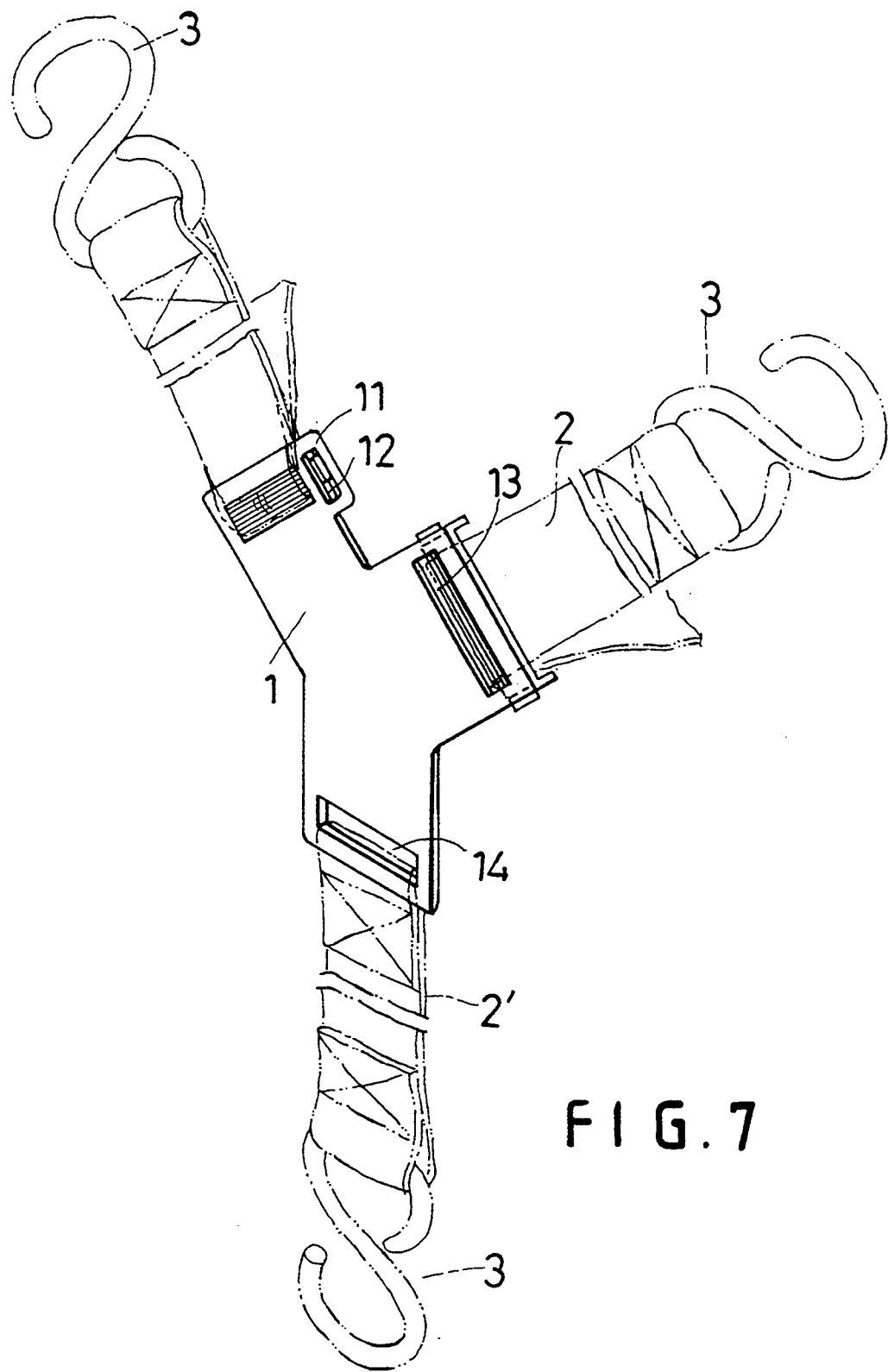
FIG. 7 is a perspective view of a sixth embodiment of the strap locking device of the present invention.

A sixth embodiment of the strap locking device, as shown in FIG. 7, includes a strap locker 1 having two strap stoppers 13 disposed in two of three ends of a plate body. Each strap stopper is secured within two slots 12, 12 formed in opposing side walls 11, 11, just as those in the fifth embodiment. A strap slot 14 is formed in one of the three ends of the plate body, the three ends extending in three directions.

Figure 8:
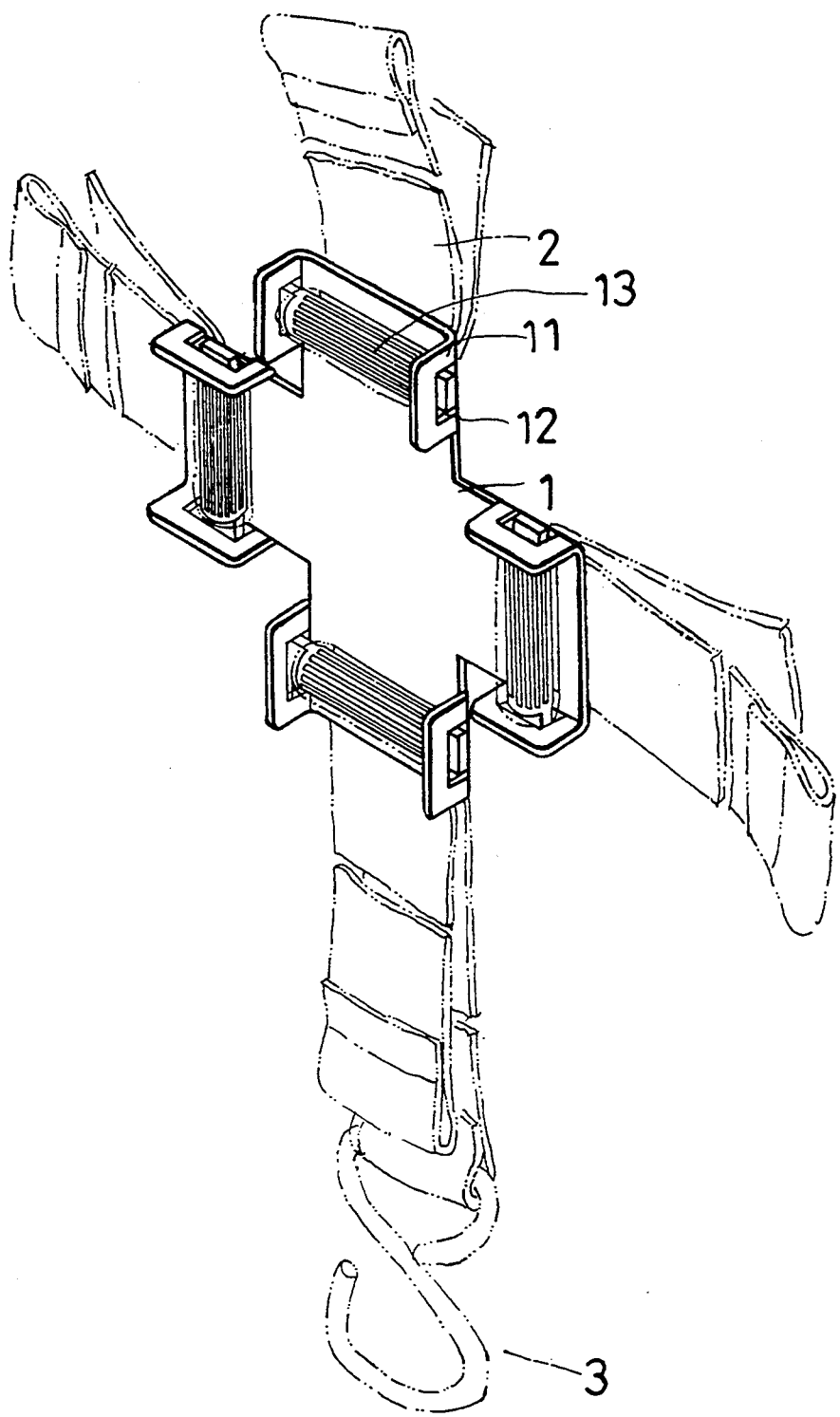
FIG. 8 is a perspective view of a seventh embodiment of the strap locking device of the present invention.

A seventh embodiment of the strap locking device, as shown in FIG. 8, includes a strap locker 1 having four strap stoppers 13 integrally formed in four ends of a cross-shaped plate body. Each strap stopper 13 being structured the same as those of the sixth embodiment.

Figure 9:
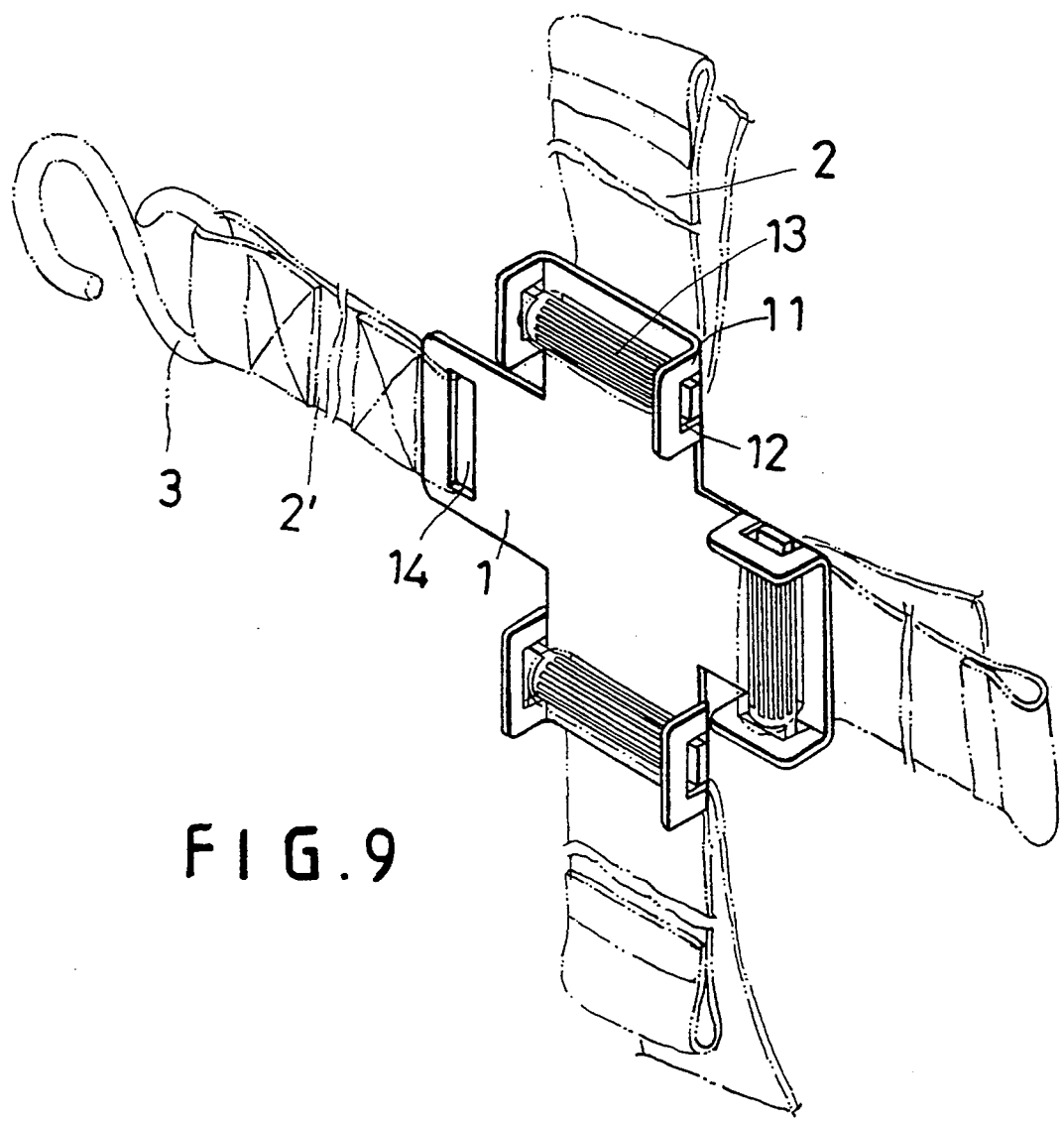
FIG. 9 is a perspective View of an eighth embodiment of the strap locking device of the present invention.

An eighth embodiment of the strap locking device, as shown in FIG. 9, includes a strap locker 1 having three strap stoppers 13 on three of four ends of a cross-shaped plate body and a strap slot 14 formed in the fourth end of the plate body. A strap 2' of predetermined length is provided to go through the strap slot 14 and has its distal end coupled to a hook 3 for engaging a hook of a truck.

Figure 10:
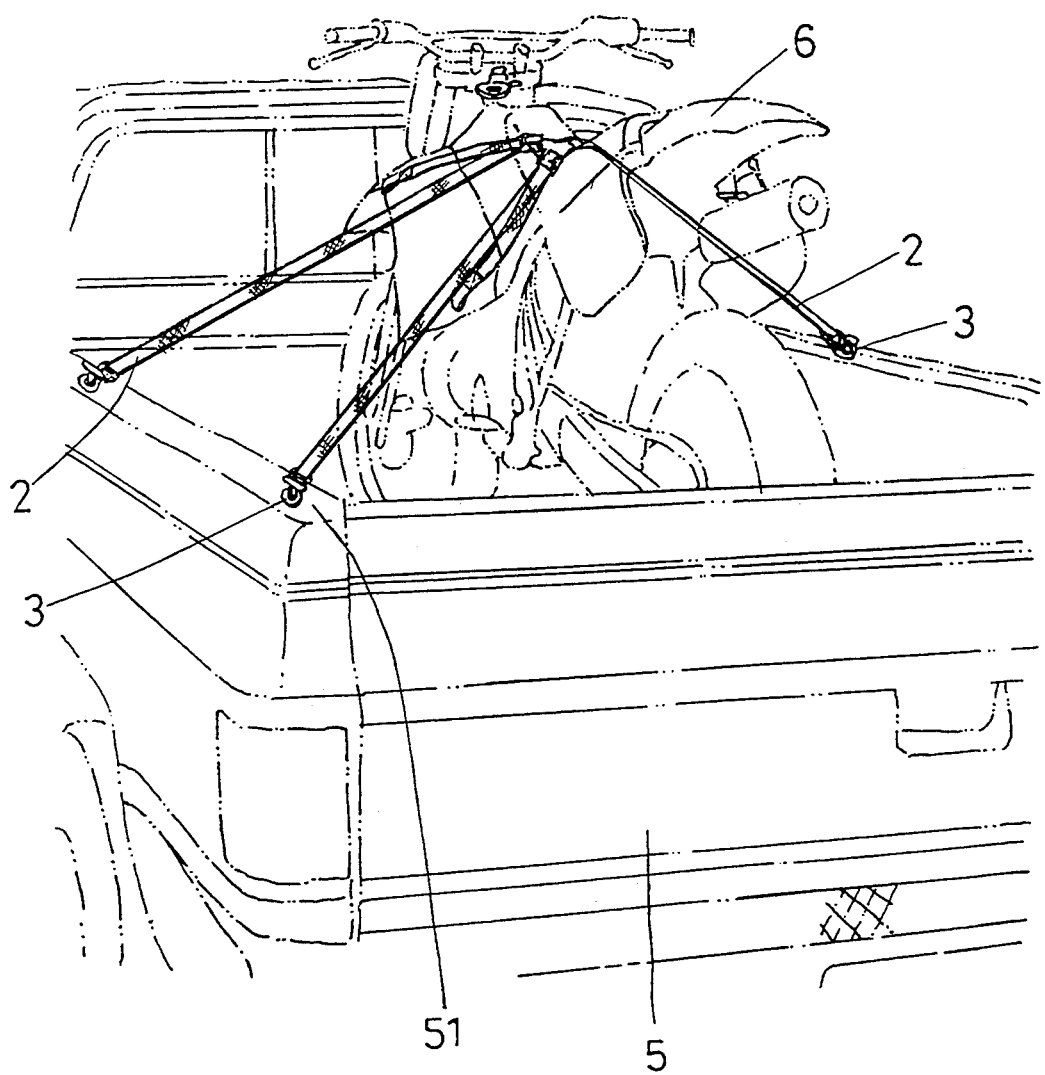
FIG. 10 is a perspective view of the first, the second, the fifth, or the sixth embodiment of the strap locking device being used to bind good; and, FIG. 11 is a perspective view of the third, the fourth, the seventh or the eighth embodiment of the strap locking device being used to bind goods.
Figure 11:
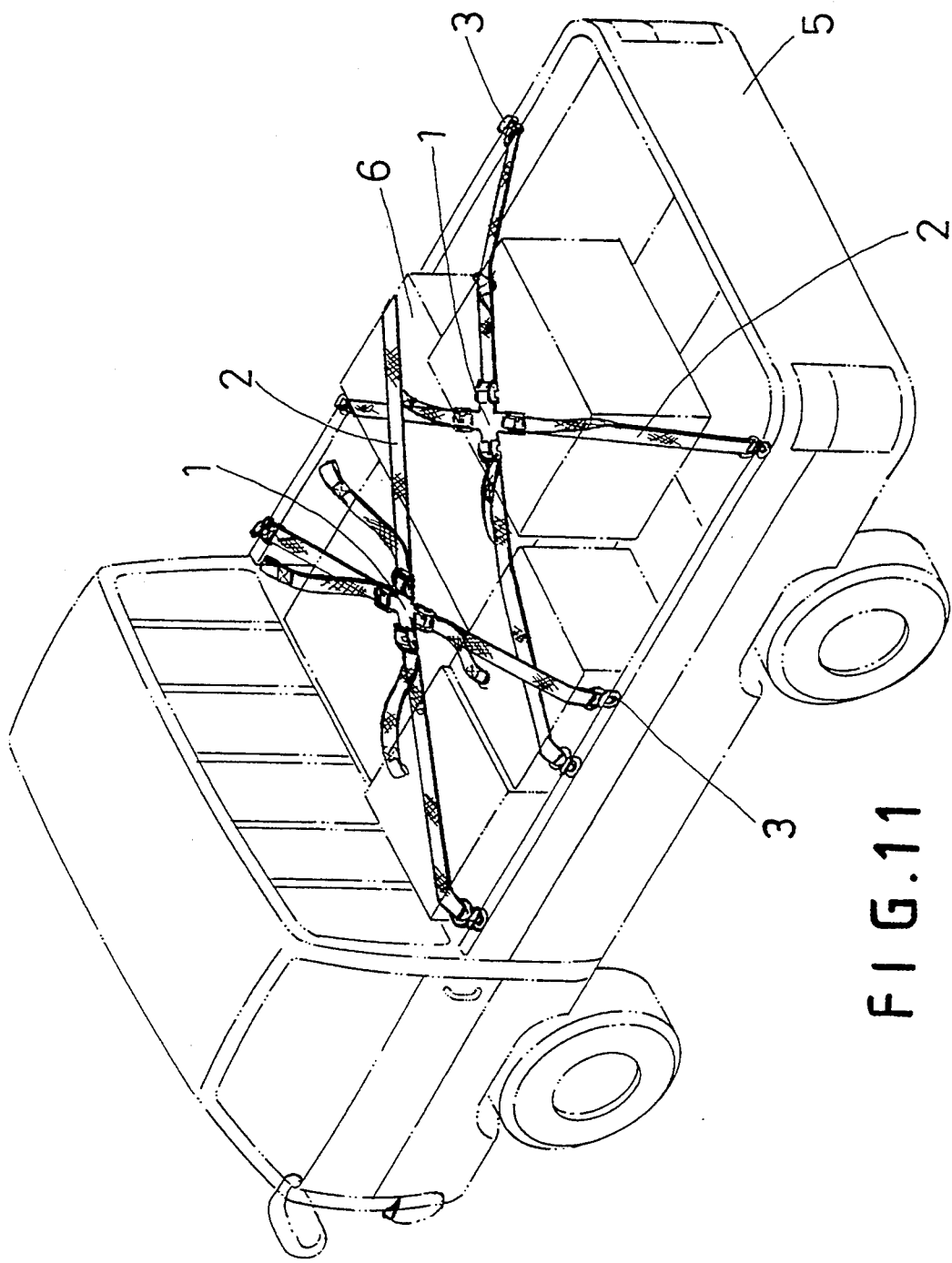

The use of the strap locking device is shown in FIG. 10. The first, the second, the fifth or the sixth embodiment of the strap locking device can be applied to bind freight 6 on a truck 5, depending on the condition of the freight 6. The hooks 3 at the distal ends of the adjustable strap 2 or unadjustable strap 2' are engaged to the stationary hooks 51 of the truck 5. FIG. 11 shows how the third, the fourth, the seventh or the eighth embodiments may be applied to secure freight on a truck, with the hooks 3 of the adjustable strap 2 or the unadjustable strap 2' engaged with hooks 51 of a truck.

While the preferred embodiments of the invention have been described above, it will be recognized and understood that various modifications may be made therein and the appended claims are intended to cover all such modifications which may fall within the spirit and scope of the invention.

What is claimed is:

1. A strap locking device for use in binding freight, comprising:
   a plurality of strap members, each of said plurality of strap members having opposing first and second ends;
   a plurality of strap hook members, each of said plurality of strap hook members being fixedly coupled to a first end of a respective one of said plurality of strap members; and,
   a Y-shaped plate body having three end portions extending in different directions, at least two of said three end portions each having (1) integrally formed side wall members formed on two opposing sides thereof, and (2) means for adjustably securing a section of a respective one of said plurality of strap members disposed between a respective pair of said side wall members, said section of said strap member being displaced from said first end thereof.

2. The strap locking device as recited in claim 1 where said means for adjustably securing a section of said strap member includes:
   a. a pin coupled between said side wall members;
   b. a push plate member pivotally coupled to said pin for clampingly engaging said section of said strap member between one end of said push plate and a portion of a respective plate body end portion; and,
   c. a spring member disposed on said pin and engaged with said push plate for applying a bias clamping force to said push plate.

3. The strap locking device as recited in claim 1 where said means for adjustably securing a section of said strap member includes a stopper member slidably coupled to a respective plate body end section, said plate body having a pair of elongated slotted through openings formed in said opposing wall members and a slotted opening formed through a portion of said plate body end section, said stopper member having a pair of opposing end portions adapted for passage through said elongated slotted through openings to provide said slidable coupling, said stopper member being disposed above said slotted opening formed through a portion of said plate body end section, whereby a selected section of a respective strap member passes through said plate body end section slotted opening, over said stopper member and back through said plate body end section slotted opening.

4. A strap locking device for use in binding freight, comprising:
   a plurality of strap members, each of said plurality of strap members having opposing first and second ends;
   a plurality of strap hook members, each of said plurality of strap hook members being fixedly coupled to a first end of a respective one of said plurality of strap members; and,
   a cross-shaped plate body having four end portions extending in different directions, at least three of said four end portions each having (1) integrally formed side wall members formed on two opposing sides thereof, and (2) means for adjustably securing a section of a respective one of said plurality of strap members disposed between a respective pair of said side wall members, said section of said strap member being displaced from said first end thereof.

5. The strap locking device as recited in claim 4 where said means for adjustably securing a section of said strap member includes:
   a. a pin coupled between said side wall members;
   b. a push plate member pivotally coupled to said pin for clampingly engaging said section of said strap member between one end of said push plate and a portion of a respective plate body end portion; and,
   c. a spring member disposed on said pin and engaged with said push plate for applying a bias clamping force to said push plate.

6. The strap locking device as recited in claim 4 where said means for adjustably securing a section of said strap member includes a stopper member slidably coupled to a respective plate body end section, said plate body having a pair of elongated slotted through openings formed in said opposing wall members and a slotted opening formed through a portion of said plate body end section, said stopper member having a pair of opposing end portions adapted for passage through said elongated slotted through openings to provide said slidable coupling, said stopper member being disposed above said slotted opening formed through a portion of said plate body end section, whereby a selected section of a respective strap member passes through said plate body end section slotted opening, over said stopper member and back through said plate body end section slotted opening.

* * * * *